United States Patent
Croak et al.

(10) Patent No.: US 8,098,281 B1
(45) Date of Patent: Jan. 17, 2012

(54) METHOD AND APPARATUS FOR PROVIDING A VIDEO SESSION WITH IMAGES CAPTURED FROM WEB BASED CAMERAS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1544 days.

(21) Appl. No.: 11/240,318

(22) Filed: Sep. 30, 2005

(51) Int. Cl.
*H04N 7/18* (2006.01)
(52) U.S. Cl. .......................................... 348/143; 348/152
(58) Field of Classification Search .................. 348/143, 348/152
See application file for complete search history.

(56) References Cited

U.S. PATENT DOCUMENTS

| | | | |
|---|---|---|---|
| 2002/0147982 A1* | 10/2002 | Naidoo et al. | 725/105 |
| 2004/0109061 A1* | 6/2004 | Walker et al. | 348/152 |
| 2004/0120486 A1* | 6/2004 | Creamer et al. | 379/102.01 |
| 2005/0068175 A1* | 3/2005 | Faulkner et al. | 340/541 |

* cited by examiner

*Primary Examiner* — Houshang Safaipour

(57) ABSTRACT

A method and apparatus for displaying image from web based camera(s) located in a residential home to be projected onto a television monitor are disclosed. For example, as part of a home security system, a web server capturing images of passageways leading to or inside a residential home can activate a frame to be projected on a television monitor when movement is detected and a new image is captured. In addition to passively alerting homeowners to potential security threats, the present invention also enables homeowners to see the image of people outside their doorways to react accordingly.

20 Claims, 5 Drawing Sheets

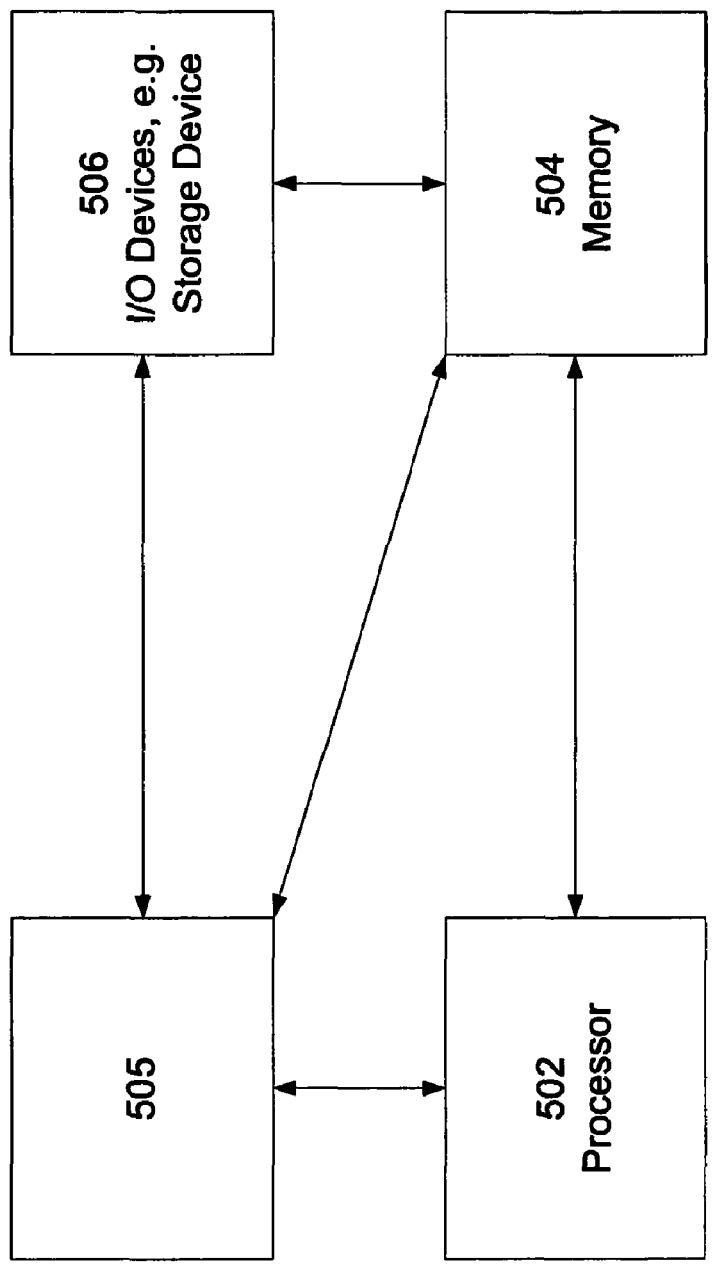

METHOD AND APPARATUS FOR PROVIDING A VIDEO SESSION WITH IMAGES CAPTURED FROM WEB BASED CAMERAS

The present invention relates generally to communication networks and, more particularly, to a method and apparatus for providing a video session with images captured from web based cameras in communication networks, e.g. packet networks such as Service over Internet Protocol (SoIP) networks.

BACKGROUND OF THE INVENTION

As extremely high bandwidth access networks become more accessible to residential subscribers, they enable service providers of these networks to integrate voice, video, and data providing more convenience for end customers and creating new service opportunities. Due to the multi-service nature of these new services, networks can provide additional functionalities to end customers to support home security monitoring services. For instance, the network can send images and alerts to a homeowner when movement is detected by a web based camera in a passageway leading to or inside a residential home.

Therefore, a need exists for a method and apparatus for providing a video session with images captured from web based cameras in a packet network, e.g., a SoIP network.

SUMMARY OF THE INVENTION

In one embodiment, the present enables a method for displaying image from web based cameras located in a residential home to be projected onto a television monitor. Specifically, as part of a home security system, a web server capturing images of passageways leading to or inside a residential home can activate a frame to be projected on a television monitor when movement is detected and a new image is captured. In addition to passively alerting homeowners to potential security threats, the present invention also enables homeowners to see the image of people outside their doorways to react accordingly. For instance, homeowners can instruct the network to open a door, lock a door, activate an intercom, or place a call to a local law enforcement agency.

BRIEF DESCRIPTION OF THE DRAWINGS

The teaching of the present invention can be readily understood by considering the following detailed description in conjunction with the accompanying drawings, in which:

FIG. 5 illustrates a high level block diagram of a general purpose computer suitable for use in performing the functions described herein.

To facilitate understanding, identical reference numerals have been used, where possible, to designate identical elements that are common to the figures.

DETAILED DESCRIPTION

Figure 1:
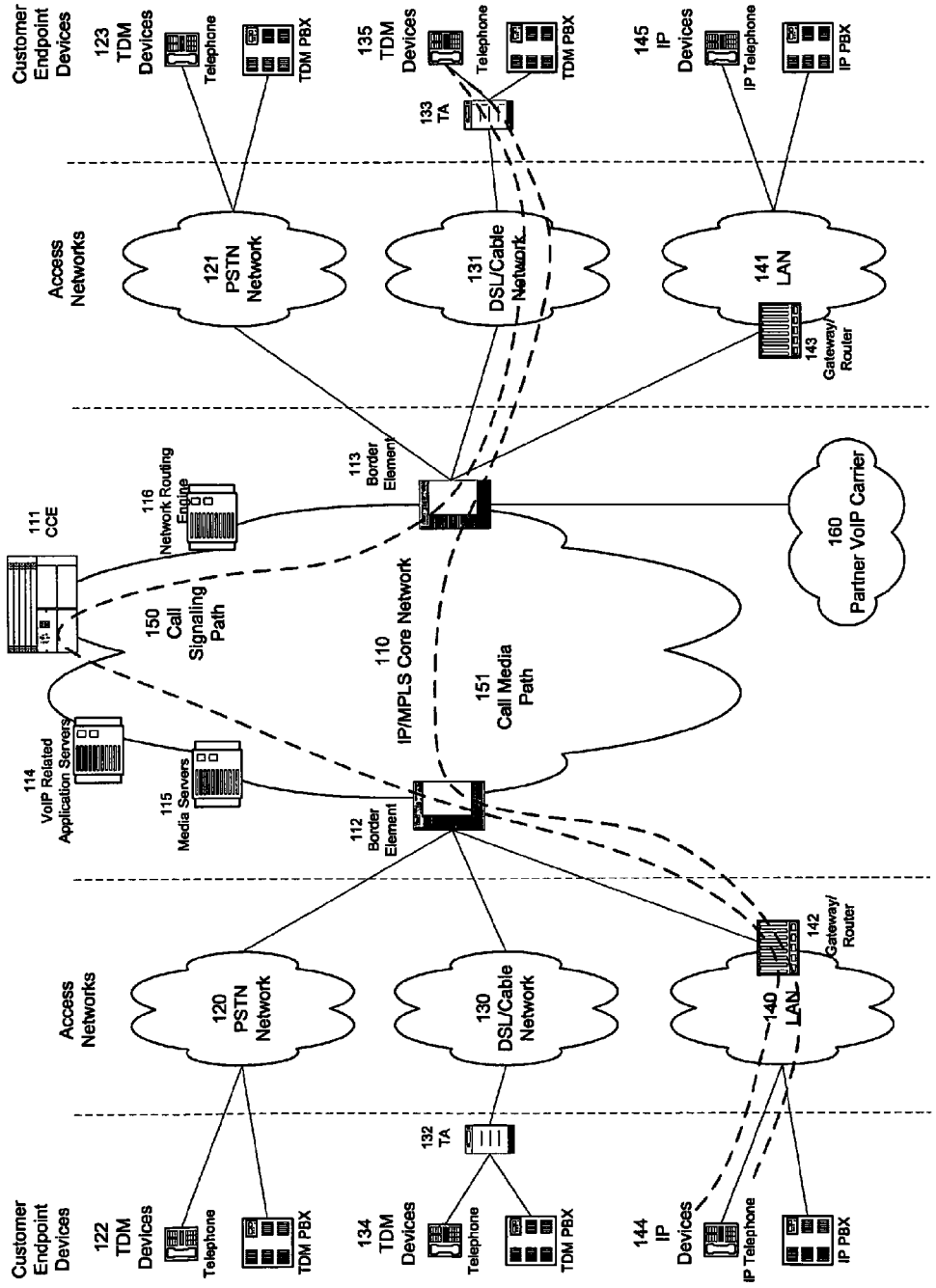
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
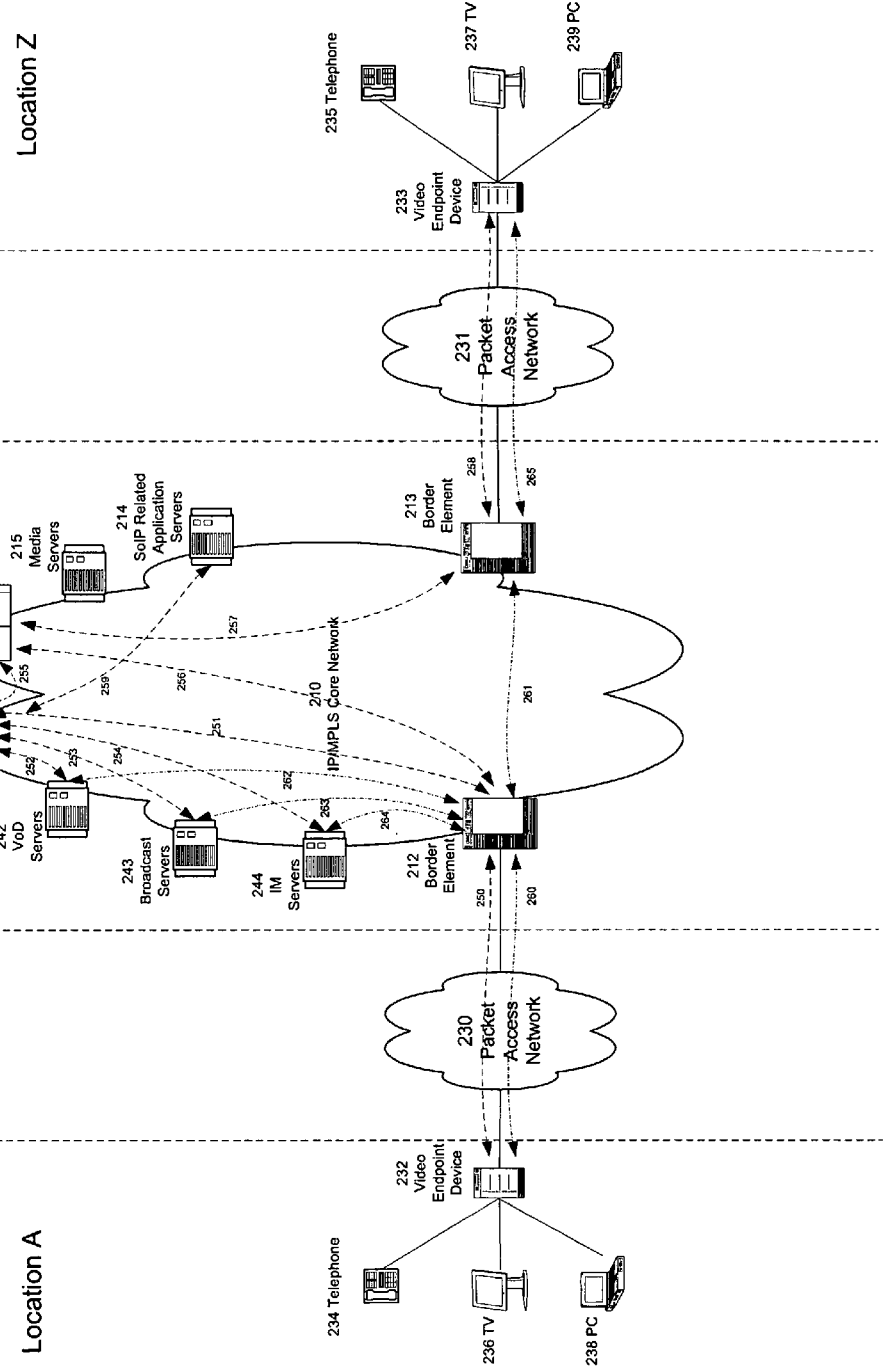
FIG. 2 illustrates an exemplary Service over Internet Protocol (SoIP) network related to the present invention.

The network shown in FIG. 1 can be extended to become a SoIP network that supports multi-service applications including, but not limited to, video services. FIG. 2 illustrates a communication architecture 200 having an example network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, the present invention should not be interpreted to be limited by this particular illustrative architecture.

Video endpoint device 232 and 233 are IP based intelligent multi-service endpoint device supporting voice, video, and data applications. Video endpoint device 232 and 233 are signaling endpoints of application sessions, e.g. a VoIP session endpoint, an instant messaging endpoint, or a video session endpoint. In one embodiment, a video endpoint device is a standalone device that can be connected to home electronic appliances such as, but is not limited to, telephone 234 and 235, TV 236 and 237, or Personal Computer (PC) 238 and 239. In another embodiment, a video endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a video endpoint device to a SoIP network that supports video services.

The core SoIP infrastructure that supports video services comprises of several key components, such the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (242), and Instant Messaging (IM) Servers 243. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between an video endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP). A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes as well. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A Broadcast Server is responsible for supporting broadcast video session requested originated by a customer and sends streaming broadcast video contents, such as TV channels, to the customer. The VoD Server and the Broadcast Server sends streaming video contents to video endpoint devices using compression technologies including, but are not limited to, Moving Picture Experts Group (MPEG) 2, MPEG 4, MPEG 7, MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a video endpoint. In one embodiment, a customer using video endpoint device 232 at location A places a VoD session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to video endpoint 232 using data path segment 260. Similarly, a customer at location Z using TV 237 connected to video endpoint 233 can request a VoD session via SC 241 with streaming VoD contents sent by VoD Server 242. Note that a VoD server may be placed closer to end users in a packet access network to serve video endpoints in an alternative embodiment.

In another embodiment, a customer using video endpoint device 232 at location A places a broadcast video session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to video endpoint 232 using data path segment 260. Similarly, a customer at location Z using TV 237 connected to video endpoint 233 can request a broadcast video session via SC 241 with streaming broadcast video contents sent by Broadcast Server 243. Note that a Broadcast server may be placed closer to end users in a packet access network to serve video endpoints in an alternative embodiment.

In another embodiment, a customer using video endpoint device 232 at location A places an IM session request to the video network using PC 238. During the session initiation, a setup signaling message is sent from video endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to video endpoint 232 via BE 212 using data path comprising data path segment 260 and 264. Similarly, a customer at location A using TV 236 connected to video endpoint 232 or a customer at location Z using PC 239 or TV 237 connected to video endpoint 233 can request an IM session via SC 241 with IM functions provided by IM Server 244.

In another embodiment, a customer using video endpoint device 232 at location A places a VoIP session request destined to video endpoint device 233 via the SoIP network that supports video services using telephone 234. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255. CCE may interact with AS 214 using signaling path segment 259 to verify customer's subscription information or to retrieve VoIP specific applications or data in order to complete the session request. The signaling flows to establish a VoIP call between video endpoint device 232 and 233 is similar to those described previously in network 100 and FIG. 1. In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to video endpoint device 233 using signaling path segment 258. Video endpoint device 233 then identifies telephone 235 and rings that telephone. Once the call is accepted at location Z by the called party, a call acknowledgement signaling message, such as a SIP 200 OK response message if SIP is used, is sent in the reverse direction back to the CCE 211. After the CCE 211 receives the call acknowledgement message, it will then send a call acknowledgement signaling message, such as a SIP 200 OK response message if SIP is used, toward the calling party at location A using signaling path comprising signaling path segment 256 and 250 via BE 212. In addition, the CCE 211 also provides the necessary information of the call to both BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two video endpoint devices, SC 241 and CCE 211 does not need to be in the data path for actual direct data exchange.

As extremely high bandwidth access networks become more accessible to residential subscribers, they enable service providers of these networks to integrate voice, video, and data providing more convenience for end customers and creating new service opportunities. Due to the multi-service nature of these new services, networks can provide additional functionalities to end customers to support home security monitoring services. For instance, the network can send images and alerts to a homeowner when movement is detected by a web based camera in a passageway leading to or inside a residential home.

To address this need, the present enables a method for displaying image from web based cameras located in a residential home to be projected onto a television monitor. Specifically, as part of a home security system, a web server capturing images of passageways leading to or inside a residential home can activate a frame to be projected on a television monitor when movement is detected and a new image is captured. In addition to passively alerting homeowners to potential security threats, the present invention also enables homeowners to see the image of people outside their doorways to react accordingly. For instance, homeowners can instruct the network to open a door, lock a door, activate an intercom, or place a call to a local law enforcement agency.

Figure 3:
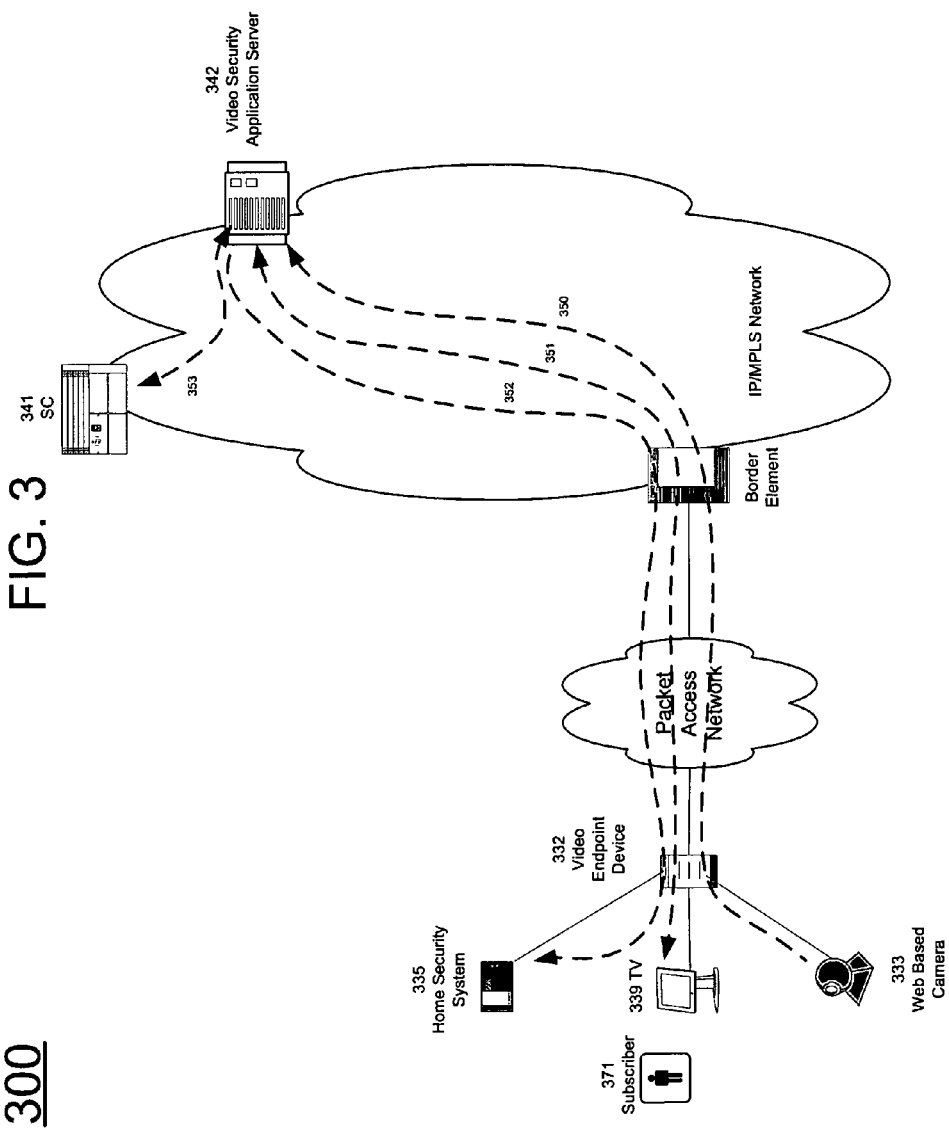
FIG. 3 illustrates an example of providing a video session with images captured from web based cameras in a packet network, e.g., a SoIP network, of the present invention.

FIG. 3 illustrates an example 300 of providing a video session with images captured from web based cameras in a packet network, e.g., a SoIP network, of the present invention. In FIG. 3, subscriber 371 subscribes to the video session with images captured from web based cameras service feature. Web based camera 333 is used to send video signal to video security application server 342 via video endpoint device 332 using flow 350. Video Security Application Server 342 constantly monitors the incoming video stream sent by web based camera 333. When a change in the video signal that corresponds to a physical movement is detected, a new image will be captured from the incoming video signal stream by Video Security Application Server 342 and immediately sent to subscriber 371 to be displayed on TV 339 using flow 351. The newly captured image will then be displayed in a new display frame as a new video session. Subscriber 371 can instantly be alerted of the arrival of such a newly capture image. Subscriber 371 can view the image and then react accordingly by instructing Video Security Application Server 342 using flow 351 to perform desired actions including, but are not limited to, opening a doorway, locking a doorway, activating an intercom, or calling the law enforcement agency. In turn, Video Security Application Server 342 sends the desired actions to be performed to Home Security System 335 using flow 352 to be executed.

Note that the newly captured image can be sent to any SoIP endpoint specified by subscriber 371. For instance, subscriber 371 can position a web based camera at home while instructing Video Security Application Server 342 to send a newly captured image to an office location. Similarly, if subscriber 371 is located at a different location from web based camera 333, subscriber 371 can send instructions to Video Security Application Server 342 from the location where subscriber 371 currently resides to perform desired actions including, but are not limited to, opening a doorway, locking a doorway, activating an intercom, or calling the law enforcement agency.

In addition, subscriber 371 can configure Video Security Application Server 342 to automatically perform certain actions when a movement is detected by Video Security Application Server 342. This feature is particularly useful if subscriber 371 is not physically present to view the newly captured image caused by a movement detected. For instance, subscriber 371 can instruct and configure Video Security Application Server 342 to immediately open a doorway, lock a doorway, activate an intercom, or call the local law enforcement agency if appropriate when a new movement is detected. Video Security Application Server 342 can send a signal to Home Security System 335 using flow 352 to perform the configured actions such as locking a doorway. Video Security Application Server 342 can also initiate a call to the local enforcement agency via SC 341 using flow 353 if the configured action by subscriber 371 is to call the law enforcement agency when a movement is detected.

Figure 4:
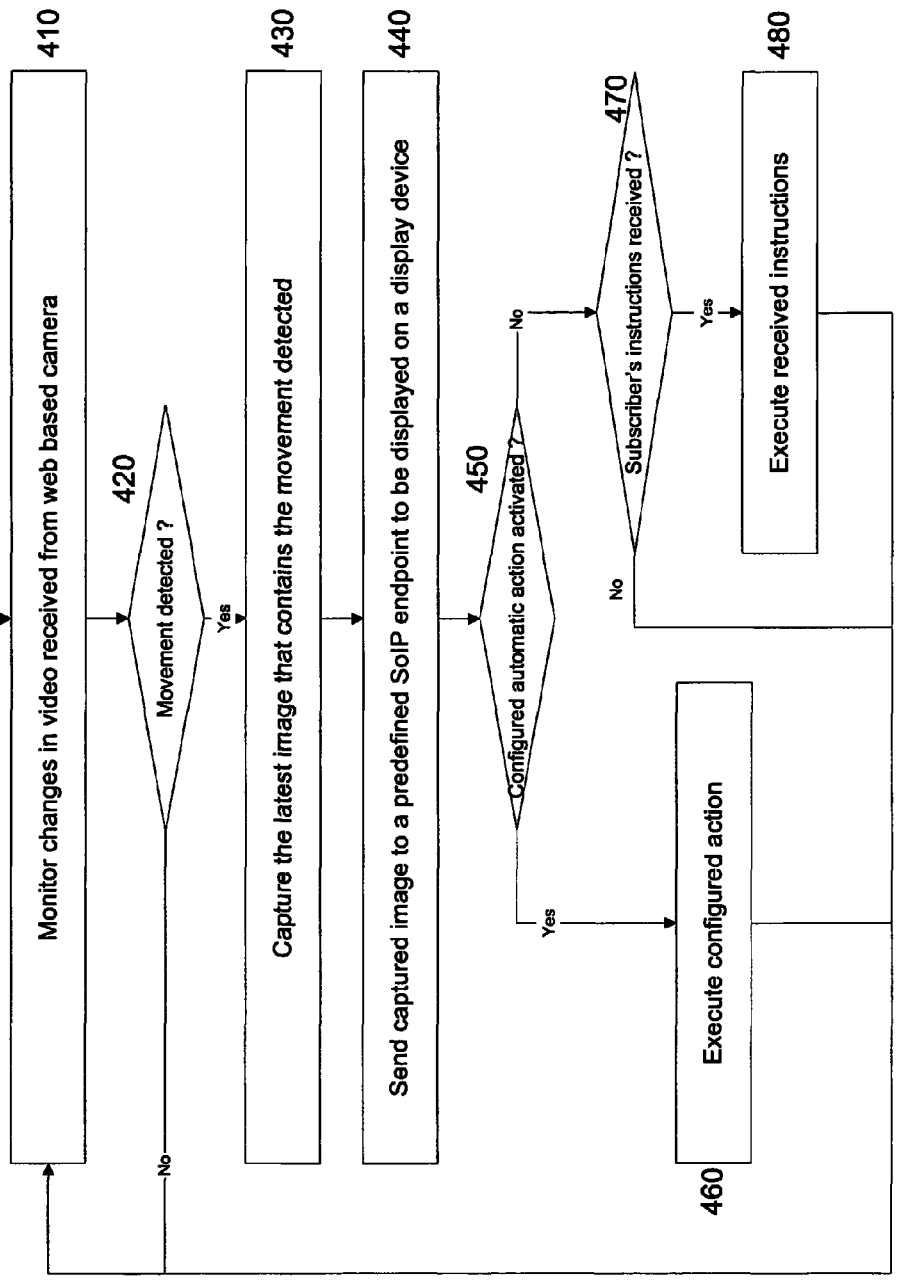
FIG. 4 illustrates a flowchart of a method for providing a video session with images captured from web based cameras in a packet network, e.g., a SoIP network, of the present invention.

FIG. 4 illustrates a flowchart of a method 400 for providing a video session with images captured from web based cameras in a packet network, e.g., a SoIP network, of the present invention. Method 400 starts in step 405 and proceeds to step 410.

In step 410, the method monitors a video signal sent by a web based camera from a subscriber location. The video signal is monitored by a Video Security Application Server.

In step 420, the method checks if a movement caused by changes in the video signal is detected. If a movement is detected, the method proceeds to step 430; otherwise, the method proceeds back to step 410.

In step 430, the method captures a new image that contains the movement detected from the video signal. The new image is captured by the Video Security Application Server.

In step 440, the method sends the newly captured image to a SoIP endpoint specified by the subscriber. The newly captured image is sent by the Video Security Application Server. The captured image will be displayed on a video display device at the specified SoIP endpoint in a new video frame as a new video session.

In step 450, the method checks if the subscriber has activated the configured automatic action in response to the detection of a movement. If the subscriber has activated the configured automatic action, the method proceeds to step 460; otherwise, the method proceeds to step 470.

In step 460, the method executes the automatic action as configured by the subscriber. Configured actions include, but are not limited to, opening a doorway, locking a doorway, activating an intercom, and calling the local law enforcement agency. The method then proceeds back to step 410.

In step 470, the method checks if an instruction is received from the subscriber to perform a particular action. If an instruction is received, then the method proceeds to step 480; otherwise, the method proceeds back to step 410.

In step 480, the method executes the received instruction sent by the subscriber. Received instructions include, but are not limited to, opening a doorway, locking a doorway, activating an intercom, and calling the local law enforcement agency. The method then proceeds back to step 410.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a video session with images captured from web based cameras, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a video session with images captured from web based cameras can be loaded into memory 504 and executed by processor 502 to implement the functions as discussed above. As such, the present process 505 for providing a video session with images captured from web based cameras (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a video session with images captured from a web based camera, comprising:
    detecting a change in a video signal that corresponds to a physical movement at a location captured by the web based camera, wherein the change is detected by a video security application server from images contained in the video signal, wherein the video security application server is deployed in a communication network, wherein the web based camera is deployed in a location that is external to the communication network; and
    establishing the video session with the images captured from the web based camera to a subscriber of the communication network if the change is detected.

2. The method of claim 1, wherein the communication network is a service over internet protocol network.

3. The method of claim 1, wherein the establishing comprises:
    capturing a new image file that comprises the change that is detected from the video signal; and
    sending the new image file to a service over internet protocol endpoint specified by the subscriber.

4. The method of claim 3, wherein the new image file is sent to the service over internet protocol endpoint specified by the subscriber to be displayed in an independent display frame as a new video session.

5. The method of claim 1, further comprising:
    executing automatically a security action configured by the subscriber.

6. The method of claim 5, wherein the security action comprises locking a doorway.

7. A non-transitory computer-readable medium having stored thereon a plurality of instructions, the plurality of instructions including instructions which, when executed by a processor, cause the processor to perform a method for providing a video session with images captured from a web based camera comprising:
    detecting a change in a video signal that corresponds to a physical movement at a location captured by the web based camera, wherein the change is detected by a video security application server from images contained in the video signal, wherein the video security application server is deployed in a communication network, wherein the web based camera is deployed in a location that is external to the communication network; and
    establishing the video session with the images captured from the web based camera to a subscriber of the communication network if the change is detected.

8. The non-transitory computer-readable medium of claim 7, wherein the communication network is a service over internet protocol network.

9. The non-transitory computer-readable medium of claim 7, wherein the establishing comprises:
    capturing a new image file that comprises the change that is detected from the video signal; and
    sending the new image file to a service over internet protocol endpoint specified by the subscriber.

10. The non-transitory computer-readable medium of claim 9, wherein the new image file is sent to the service over internet protocol endpoint specified by the subscriber to be displayed in an independent display frame as a new video session.

11. The non-transitory computer-readable medium of claim 7, further comprising:
    executing automatically a security action configured by the subscriber.

12. The non-transitory computer-readable medium of claim 11, wherein the security action comprises locking a doorway.

13. An apparatus for providing a video session with images captured from a web based camera, comprising:
    a video security application server configured to:
        detect a change in a video signal that corresponds to a physical movement at a location captured by the web based camera, wherein the change is detected from images contained in the video signal, wherein the video security application server is deployed in a communication network, wherein the web based camera is deployed in a location that is external to the communication network; and
        establish the video session with the images captured from the web based camera to a subscriber of the communication network if the change is detected.

14. The apparatus of claim 13, wherein the communication network is a service over internet protocol network.

15. The apparatus of claim 13, wherein the video security application server is further configured to:
    capture a new image file that comprises the change that is detected from the video signal; and
    send the new image file to a service over internet protocol endpoint specified by the subscriber.

16. The apparatus of claim 15, wherein the new image file is sent to the service over internet protocol endpoint specified by the subscriber to be displayed in an independent display frame as a new video session.

17. The apparatus of claim 13, wherein the video security application server is further configured to:
    cause an execution of a security action configured by the subscriber.

18. The apparatus of claim 17, wherein the security action comprises opening a doorway.

19. The method of claim 5, wherein the security action comprises opening a doorway.

20. The non-transitory computer-readable medium of claim 11, wherein the security action comprises opening a doorway.

* * * * *